(12) United States Patent
Kim et al.

(10) Patent No.: US 6,873,656 B2
(45) Date of Patent: Mar. 29, 2005

(54) METHOD FOR VIDEO ENCODING BY UTILIZING INTRA UPDATING TECHNIQUE BASED ON ERROR PROBABILITIES ESTIMATED FROM SIZE OF BIT STREAM FOR EACH BLOCK

(75) Inventors: Hyun-Cheol Kim, Taejon (KR); Jun-Geun Jeon, Seoul (KR); Myoung-Ho Lee, Taejon (KR); Young-Kwon Lim, Taejon (KR); Jin-Suk Kwak, Taejon (KR)

(73) Assignee: Electronics and Telecommunication Research Institute, Taejon (KR)

( * ) Notice: Subject to any disclaimer, the term of this patent is extended or adjusted under 35 U.S.C. 154(b) by 730 days.

(21) Appl. No.: 09/746,481

(22) Filed: Dec. 26, 2000

(65) Prior Publication Data

US 2002/0126757 A1 Sep. 12, 2002

(30) Foreign Application Priority Data

Dec. 24, 1999 (KR) .......................................... 1999-61871
Dec. 5, 2000 (KR) .......................................... 2000-73470

(51) Int. Cl.$^7$ ................................................ H04N 7/12
(52) U.S. Cl. .......................... 375/240.13; 375/240.16; 375/240.27; 348/404.1
(58) Field of Search ....................... 375/240.13, 240.15, 375/240.16, 240.24, 240.27; 348/404.1; 382/239

(56) References Cited

U.S. PATENT DOCUMENTS

| 5,528,284 | A | | 6/1996 | Iwami et al. | |
|---|---|---|---|---|---|
| 5,686,963 | A | * | 11/1997 | Uz et al. | 375/240.06 |
| 5,751,358 | A | * | 5/1998 | Suzuki et al. | 375/240.04 |
| 5,832,121 | A | * | 11/1998 | Ando | 382/236 |
| 6,081,296 | A | * | 6/2000 | Fukunaga et al. | 375/240.12 |
| 6,480,540 | B1 | * | 11/2002 | Guillotel | 375/240.03 |
| 6,625,215 | B1 | * | 9/2003 | Faryar et al. | 375/240.14 |
| 6,658,058 | B1 | * | 12/2003 | Kuroda et al. | 375/240.12 |
| 2002/0172282 | A1 | * | 11/2002 | Kato | 375/240.13 |

OTHER PUBLICATIONS

Judy Y. Liao and John D. Villasenor; *Adaptive Intra Update for Video Coding over Noisy Channels;* 1996 @ IEEE; pp. 763–766.

* cited by examiner

*Primary Examiner*—Jeffery Hofsass
*Assistant Examiner*—George A Bugg, Jr.
(74) *Attorney, Agent, or Firm*—Mayer, Brown, Rowe & Maw LLP

(57) ABSTRACT

A video encoding method and a computer-readable record media for performing the method are disclosed, in which in carrying out the video encoding, an intra updating technique is adopted by sorting out the blocks requiring an intra updating by utilizing the bit stream size information for each block, thereby maximizing the intra updating effect. The video encoding method includes the following steps. That is, at a first step, an encoding method for each frame of incoming images is selected, and the images are divided into blocks of a certain size. At a second step, either an intra coded block encoding or an inter coded block encoding is carried out depending on whether an encoding of a current frame and an inter coded encoding are needed or not, and whether an intra coded block is relevant or not. Further, blocks requiring an intra updating are sorted out by utilizing a bit stream size information for each block if the inter coded encoding is needed. At a third step, the first and second steps are repeatedly carried out to the last frame.

7 Claims, 3 Drawing Sheets

METHOD FOR VIDEO ENCODING BY UTILIZING INTRA UPDATING TECHNIQUE BASED ON ERROR PROBABILITIES ESTIMATED FROM SIZE OF BIT STREAM FOR EACH BLOCK

FIELD OF THE INVENTION

The present invention relates to a method for video encoding; and more particularly, to a method for video encoding by utilizing an intra updating technique based on error probabilities estimated from a size of bit stream for each block. The present invention also relates to a computer-readable record media for realizing the encoding method.

DESCRIPTION OF THE PRIOR ART

Generally, the video communication system which carries moving images uses a limited band width, and therefore, in order to reduce the amount of the information to be transmitted, the images are compressed before the transmission.

Under this condition, the usual video encoding method is the estimated encoding method in which the time overlaps present between the continuous video frames are eliminated.

In the estimated encoding method, the encoding is carried out separately for intra coded frames and inter coded frames. The inter coded frames are encoded by applying the discrete cosine transformation and quantizing technique after removing the time overlaps between the continuous frames based on the motion estimation and compensation method. The intra coded frames are encoded by applying the discrete cosine transformation and quantizing method without removing the time overlaps.

Accordingly, in encoding the inter coded frames, the result of the decoding of the preceding frame has to be adopted as the criteria for the decoding of the current frame.

Therefore, if errors occur in the encoded bit stream due to the channel errors, then the influence of the errors reaches not only the current frame but also the incoming frames in which the frame with the error is used as the criteria.

Further, the following proposal has been made. That is, some blocks within the inter coded frame are encoded by applying an intra updating technique in which the motion estimation and compensating techniques are not employed, but the encoding is carried out in a manner same as that for the regular intra coded frames, so that error occurrence rate would be minimized. However, in the conventional intra updating techniques, the error propagation due to the fact that the error occurrence frequency depends on the length of the block is not taken into account. At this situation, the regularly updated blocks are set up, and therefore, the effect of the intra updating cannot be maximized.

SUMMARY OF THE INVENTION

The present invention is intended to overcome the above described disadvantages of the conventional techniques.

Therefore it is an object of the present invention to provide a video encoding method and a recording medium for realizing the method and readable by a program loaded in a computer, in which in carrying out the video encoding, an intra updating technique is adopted by sorting out the blocks requiring an intra updating by utilizing the bit stream size information for each block, thereby maximizing the intra updating effect.

In achieving the above object, a video encoding method according to the present invention includes the steps of:

a) selecting an encoding method for each frame of incoming images, and dividing the images into blocks of a certain size; b) carrying out either an intra coded block encoding or an inter coded block encoding depending on whether an encoding of the current frame and an inter coded encoding are needed or not, and whether an intra coded block is relevant or not, and sorting out blocks requiring an intra updating by utilizing a bit stream size information for each block if the inter coded encoding is needed; and repeatedly carrying out the step a) and the step b) to the last frame.

In another aspect of the present invention, a computer-readable record media storing instructions for performing the method in a video encoding system with a large processor according to the present invention includes the functions of: a) selecting an encoding method for each frame of incoming images, and dividing the images into blocks of a certain size; b) carrying out either an intra coded block encoding or an inter coded block encoding depending on whether an encoding of the current frame and an inter coded encoding are needed or not, and whether an intra coded block is relevant or not, and sorting out blocks requiring an intra updating by utilizing a bit stream size information for each block if the inter coded encoding is needed; and c) repeatedly carrying out the functions a) and b) to the last frame.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

The preferred embodiment of the method of the present invention will be described referring to the attached drawings.

Figure 1:
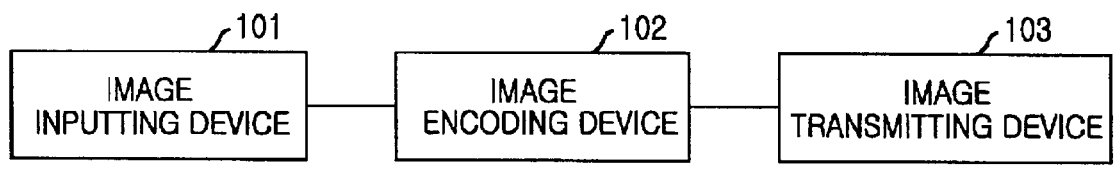
FIG. 1 is a block diagram showing the constitution of a video encoding system to which the method of the present invention is applied.

FIG. 1 is a block diagram showing the constitution of a video encoding system to which the method of the present invention is applied.

As shown in this drawing, the video encoding system includes: a video inputting device 101 for receiving images; a video encoding device 102 for encoding the inputted images; and a video transmitting device 103 for transmitting the encoded images to an external system. The video encoding method of the present invention to which the intra updating technique is applied, is carried out by the video encoding device 102.

The present invention is applied to a video communication system in which the incoming images are divided into blocks of a certain size, and thus an estimated encoding method of encoding based on the motion estimation and compensation technique is adopted. When carrying out an encoding as a measure for the case where errors occur during the transmission, and where thus the normal decoding becomes impossible, the relevant blocks are not subjected to the inter coded frame encoding method, but to the intra coded frame encoding method. That is, by utilizing the bit stream size information of the preceding frame, the blocks which are highly influenced by the error propagation are encoded by employing the intra coded frame encoding method.

Figure 2:
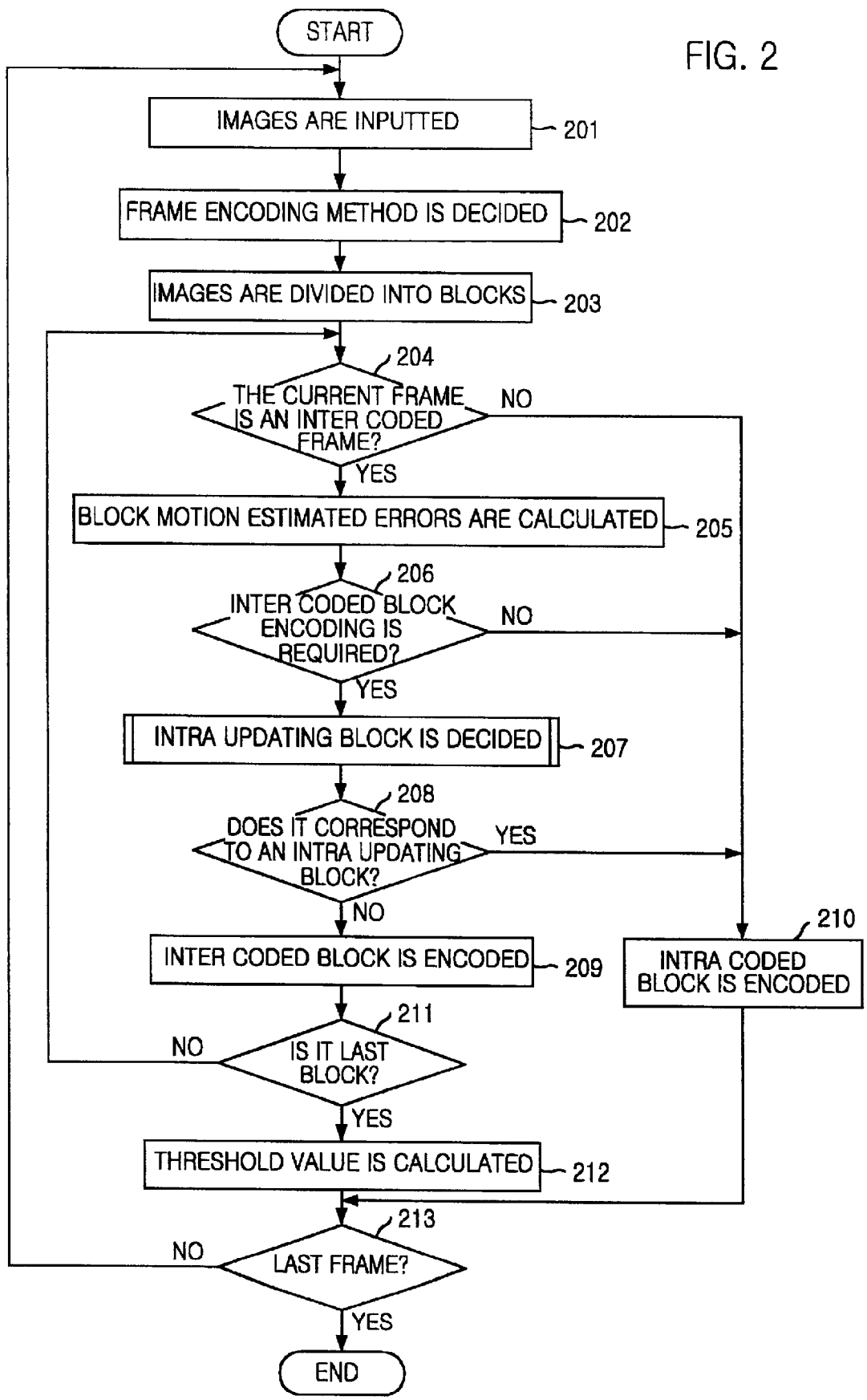
FIG. 2 is a flow chart showing the constitution of the video encoding method of the present invention in which the intra updating technique is applied for each block.

FIG. 2 is a flow chart showing the constitution of the video encoding method of the present invention in which the intra updating technique is applied for each block.

First, the images are received (201), and the adoption of the frame encoding method is decided by selecting one from among the intra coded frame encoding method and the inter coded frame encoding method in accordance with the predetermined sequence (202).

After deciding the frame encoding method, the incoming images are divided into blocks of a certain size (203), and the encoding procedures are applied to the respective blocks. The encoding procedure for the respective blocks is decided based on the current frame encoding method (204). If the current frame is not an inter coded frame, then all the blocks are encoded by the intra coded block encoding method (210). The normal intra coded block encoding method is carried out by applying the discrete cosine transformation and quantizing procedure for the pixels within each block.

If the current frame is judged to be an inter coded frame (204), then first the estimated motion errors are calculated for the current block by applying the usual motion estimation and compensating method (205). If the estimated motion errors are larger than the threshold value, then a judgment is carried out as to whether the current block has to be subjected to the inter block encoding method (206).

In order to minimize the influence of the errors during the estimated encoding, the blocks to be subjected to an intra updating are decided (207), and a judgment is made as to whether the blocks correspond to the ones to be intra-updated. If the blocks are found to be intra-updated, then the intra block encoding is carried out (210), and otherwise, the inter block encoding is carried out (209).

After the completion of the encoding of the blocks, a judgment is carried out as to whether the current block is the last block (211). If it is not the last block, then the block encoding is continued, while if it is the last block, then a threshold value is calculated (212). The calculation of the threshold value is carried out in the following manner. That is, if the relevant frame is an inter coded frame, the number of the bits which is decided based on the number of the bits formed in the block is taken as the threshold value, or the threshold value is the number of the bits which has been determined by the user in advance.

In the former method, the number of the bits of the block, which has the largest number of the bits among the blocks (in which the intra updating has not been carried out), may be taken as the threshold value. This is just an example of determining the threshold value, and therefore, other methods may be possible. Meanwhile, if the relevant frame is an intra coded frame, then the threshold value is not varied. Then a judgment is made as to whether it is the last frame (213), and if it is not the last frame, then the next frame is encoded, while if it is the last frame, then the execution is terminated.

Figure 3:
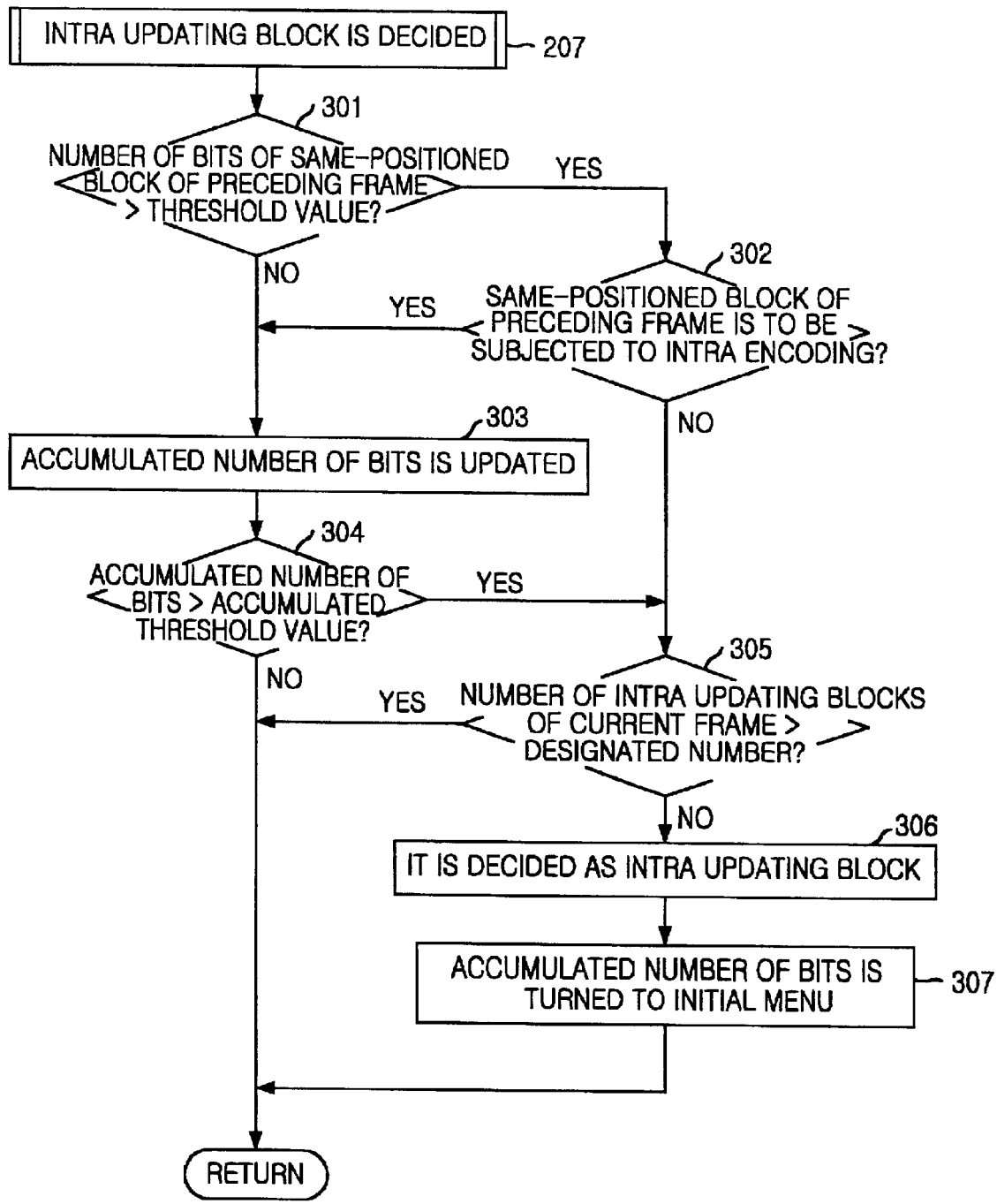
FIG. 3 is a flow chart showing the constitution of the intra updating procedure according to the present invention.

FIG. 3 is a flow chart showing the constitution of the intra updating procedure according to the present invention.

First, in order to decide the intra-updating blocks, the number of bits which is formed in the blocks of the preceding frame (which is present at a position same as that of the currently encoded block) is checked. Then a judgment is carried out as to whether the mentioned number of the bits is larger than the threshold value which has been decided based on the number of the bits of the preceding frame (301).

If the mentioned number of the bits is larger than the threshold value, then a judgment is made as to whether the same position block of the preceding frame corresponds to the one on which an intra encoding has been carried out (302). If an intra encoding has been carried out, then the accumulated number of the bits is updated (303), while if an inter encoding has been carried out, then a judgment is carried out as to whether the number of the intra updated blocks of the current frame is larger than the number which has been designated by the user (305). Here, any one of the steps (302) and (305) can selectively be performed. In other words, when the step (302) is performed, the step (305) can be disregarded or on the contrary, the step (302) is disregarded and the step (305) can be performed.

When a judgment is made as to the number of the bits which is formed in the block of the preceding frame positioned at the same position as the currently encoded block (301), if the mentioned number of the bits is smaller than the threshold value which has been decided based on the number of the bits of the preceding frame, then the number of the bits of the blocks of the preceding frame is added to the current accumulated number of bits so as to update the accumulated number of the bits (303).

Then a judgment is made as to whether the updated accumulated number of the bits is larger than the accumulated threshold value which has been calculated based on the encoding information or has been decided in advance by the user (304).

The accumulated threshold value can be calculated based on the encoding information as shown by the following formula:

Formula 1

Accumulated threshold value=Br/(Fr×MBnum)×n, where Br is the rate of bits, Fr is the rate of frames, Mbnum is the number of blocks within a frame, and n is the average accumulated number of blocks which is accumulated until the blocks are intra-encoded.

If the accumulated number of the bits is decided by the user, or if it is calculated based on the encoding information, then a judgment is made as to whether the number of the intra-updated blocks is larger than the number which has been decided by the user (305).

If the former is larger than the latter, then the intra-updating block deciding procedure is terminated. On the other hand, if the former is not larger than the latter, then the current block is decided to be the intra-updating block (306), and the number of the bits which has been accumulated up to the present is turned to the initial menu (307). Then the intra-updating block deciding procedure is terminated.

The method of the present invention described above can be stored in various recording media in which a program is loaded so as to be readable by a computer. The examples of the recording medium includes CDROM, RAM, ROM, floppy disk, hard disk, optical-magnetic disk and the like.

In the above, the present invention was described based on the specific preferred embodiments and the attached drawings, but it should be apparent to those ordinarily skilled in the art that various changes and modifications can be added without departing from the spirit and scope of the present invention which will be defined in the appended claims.

According to the present invention as described above, unlike the conventional intra-updating method in which the error occurrence probabilities are disregarded, the present invention carries out the intra-updating preferably for the blocks which show a high error propagation probability, by utilizing the number of the bits for each block. Therefore, the picture quality can be greatly improved by carrying out the intra-updating. Further, based on the accumulated number of the bits, the blocks in which the intra-updating has been relatively absent are updated, and thus, the degradation of the picture quality due to the error propagation can be overcome.

Further, the segments in which the picture quality is degraded due to the channel errors are minimized, and therefore, the video communication is possible with superior picture quality even under an adverse environment.

What is claimed is:

1. A video encoding method comprising the steps of:
   a) selecting an encoding method for each frame of incoming images, and dividing the images into blocks of a certain size;
   b) carrying out either an intra coded block encoding or an inter coded block encoding depending on whether an encoding of a current frame and an inter coded encoding are needed or not, and whether an intra coded block is relevant or not, and sorting out blocks requiring an intra updating by utilizing a bit stream size information for each block if the inter coded encoding is needed; and
   c) repeatedly carrying out the step a) and the step b) to a last frame,
   wherein the step b) includes the steps of:
   b1) judging as to a current frame encoding method, so as to carry out an intra coded block encoding if the method judged is an intra encoding method, and so as to carry out an inter coded block encoding if the method judged is an inter encoding method;
   b2) carrying out the intra coded block encoding if the inter coded block encoding is found to be not needed at the step b1), and judging as to whether a block is to be subjected to an intra updating if the inter coded block encoding is found to be needed; and
   b3) carrying out an intra coded block encoding if it is found to be a block to be intra-updated at the step b2), carrying out an inter coded block encoding if it is found to be not a block to be intra-updated, and making a judgment as to whether a current block is a last block, so as to return to the step b1) if it is not a last block, and so as to calculate a threshold value if it is a last block.

2. The video encoding method as recited in claim 1, wherein at the step b3), if a relevant frame is an inter coded frame, a threshold value of a next frame is decided based on the number of bits formed in a block, or is decided to be the number of bits provided by a user in advance; and
   if the relevant frame is an intra coded frame, then a current threshold value is taken as it is.

3. The video encoding method as recited in claim 2, wherein the threshold value decided based on the number of bits formed in the block is the number of bits of a block having the maximum number of bits among blocks not subjected to an intra updating.

4. The video encoding method as recited in claim 1, wherein the procedure of deciding an intra-updating block at the step b2) includes the steps of:
   b2a) updating the accumulated number of bits if the number of bits of a same-positioned block of a preceding frame is smaller than the threshold value, or if the same-positioned block of the preceding frame is an intra coded block;
   b2b) comparing the number of intra-updating blocks with a designated number if the updated accumulated number of bits of the step b2a) is larger than the threshold value, and if the same-positioned block of the preceding frame is not an intra coded block; and
   b2c) deciding to be intra-updating blocks and turning the accumulated number of bits to an initial menu if the number of the intra-updating blocks of the current frame is found to be not larger than the designated number at the step b2b).

5. The video encoding method as recited in claim 1, wherein the procedure of deciding the intra-updating block at the step b2) includes the steps of:
   b2d) deciding to be intra-updating blocks and turning the accumulated number of bits to the initial menu if the number of bits of the same-positioned block of the preceding frame is larger than the threshold value, or if the updated accumulated number of bits is larger than the threshold value.

6. The video encoding method as recited in claim 4, wherein the accumulated threshold value of the step b2b) is the number of bits defined by a user, or is decided by a calculation based an encoding information.

7. A computer-readable record media storing instructions for performing a video encoding method in a video encoding system with a large processor, the video encoding method comprising the steps of:
   a) selecting an encoding method for each frame of incoming images, and dividing the images into blocks of a certain size;
   b) carrying out either an intra coded block encoding or an inter coded block encoding depending on whether an encoding of a current frame and an inter coded encoding are needed or not, and whether an intra coded block is relevant or not, and sorting out blocks requiring an intra updating by utilizing a bit stream size information for each block if the inter coded encoding is needed; and
   c) repeatedly carrying out the step a) and the step b) to a last frame,
   wherein the step b) includes the steps of:
   b1) judging as to a current frame encoding method, so as to carry out an intra coded block encoding if the method judged is an intra encoding method, and so as to carry out an inter coded block encoding if the method judged is an inter encoding method;
   b2) carrying out the intra coded block encoding if the inter coded block encoding is found to be not needed at the step b1), and judging as to whether a block is to be subjected to an intra updating if the inter coded block encoding is found to be needed; and
   b3) carrying out an intra coded block encoding if it is found to be a block to be intra-updated at the step b2), carrying out an inter coded block encoding if it is found to be not a block to be intra-updated, and making a judgment as to whether a current block is a last block, so as to return to the step b1) if it is not a last block, and so as to calculate a threshold value if it is a last block.

* * * * *